United States Patent [19]

Andre

[11] 4,116,453
[45] Sep. 26, 1978

[54] MULTI-PART PRESSURE CHUCK

[76] Inventor: Eugene R. Andre, 26405 Hendrie, Huntingdon Woods, Mich. 48070

[21] Appl. No.: 793,129

[22] Filed: May 2, 1977

[51] Int. Cl.² ............................................. B23B 5/22
[52] U.S. Cl. ..................................... 279/4; 279/1 SJ
[58] Field of Search ......................... 279/4, 1 SJ, 1 Q

[56] References Cited

U.S. PATENT DOCUMENTS

| 3,083,025 | 3/1963 | Herbkersman | 279/4 X |
| 3,151,871 | 10/1964 | Multer | 279/4 X |
| 3,512,756 | 5/1970 | Cleland | 279/1 Q X |
| 3,830,509 | 8/1974 | Weber | 279/4 X |
| 3,938,816 | 2/1976 | Manchester | 279/4 X |

Primary Examiner—Harrison L. Hinson
Attorney, Agent, or Firm—Barnes, Kisselle, Raisch & Choate

[57] ABSTRACT

A holding chuck for parts to be machined utilizing hydrostatic forces for the gripping pressure but including a two-stage gripping action and a multiple area arrangement wherein a combination of a mechanical gripping and a fine hydrostatic pressure lock-up permits use on rough or out-of-round parts with large tolerances as to loading clearance with the advantages of a conforming chuck pressure which prevents distortion of the parts.

7 Claims, 4 Drawing Figures

MULTI-PART PRESSURE CHUCK

This invention relates to a Multi-Part Pressure Chuck and more specifically to a holding chuck for work parts which are to be mounted for a machining operation.

The mounting of fragile work parts for finish machining has been the subject of prior patents as, for example, U.S. Patent to Andre and Rautio, No. 3,677,559 issued July 18, 1972. Parts such as cylinders or sleeves having thin walls must be held for inside finish machining without distortion to insure a proper finished part, which, when released from the chuck, will not spring to an out-of-round condition.

In some instances, these parts are rough castings or seriously out-of-round and, it is impossible to grip them in a chuck which is designed to receive round pieces or which exerts radial pressures in equal increments regardless of resistance.

It is an object of the present invention to provide a chuck which will adapt to a variety of part conditions without placing distorting forces on the parts. It is a further object to provide a chuck or workholder which combines mechanical motion with a hydrostatic pressure system for equalized final gripping forces to snug the part prior to machining or other metal working operations.

Other objects and features of the invention will be apparent in the following specification in which the invention is described together with the manner of making and using it, all in connection with the best mode presently contemplated for the carrying out of the invention.

Figure 1:
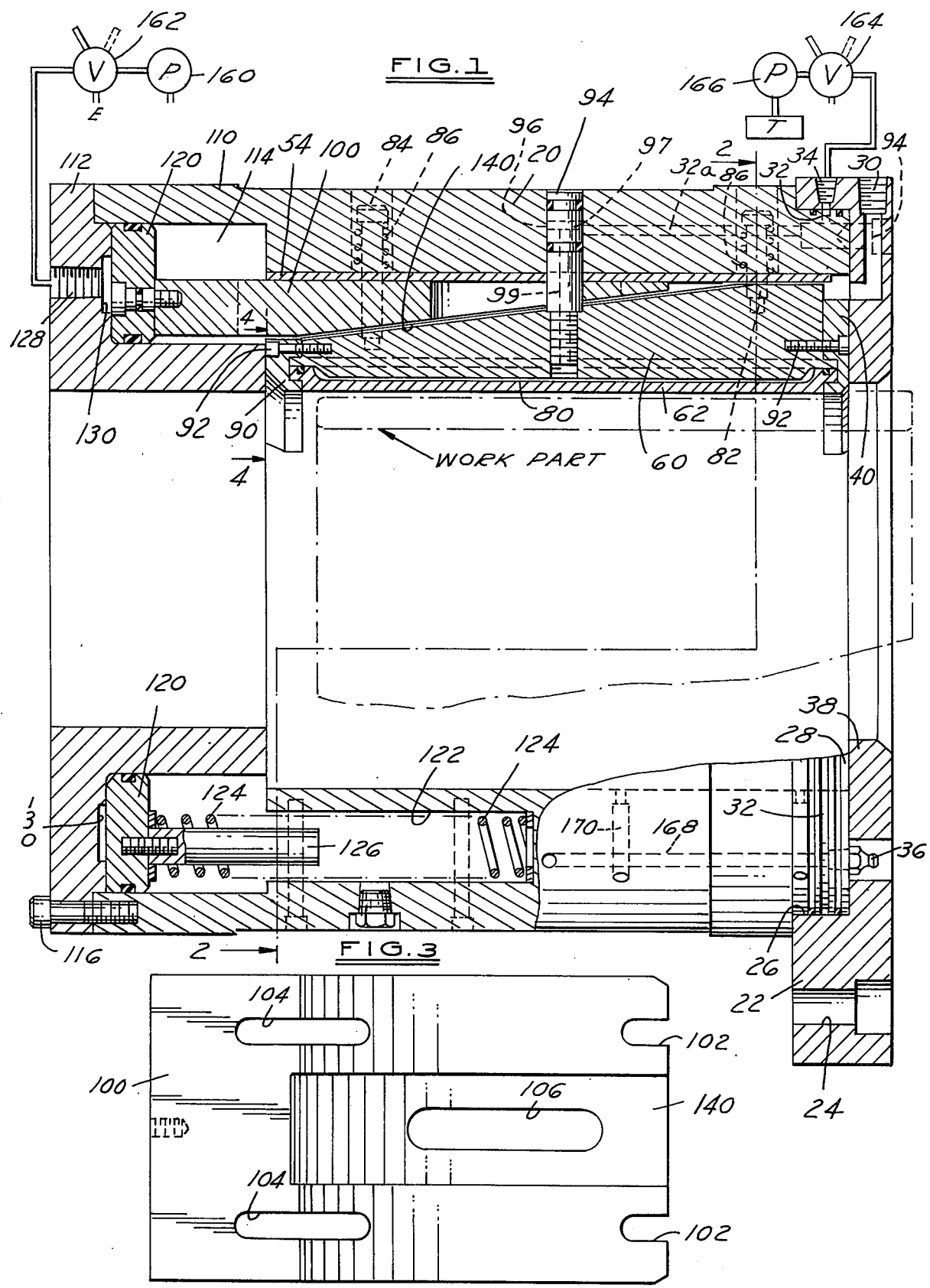

Drawings accompany the disclosure and the various views thereof may be briefly described as:

FIG. 1, a sectional view of the assembled chuck.

Figure 2:
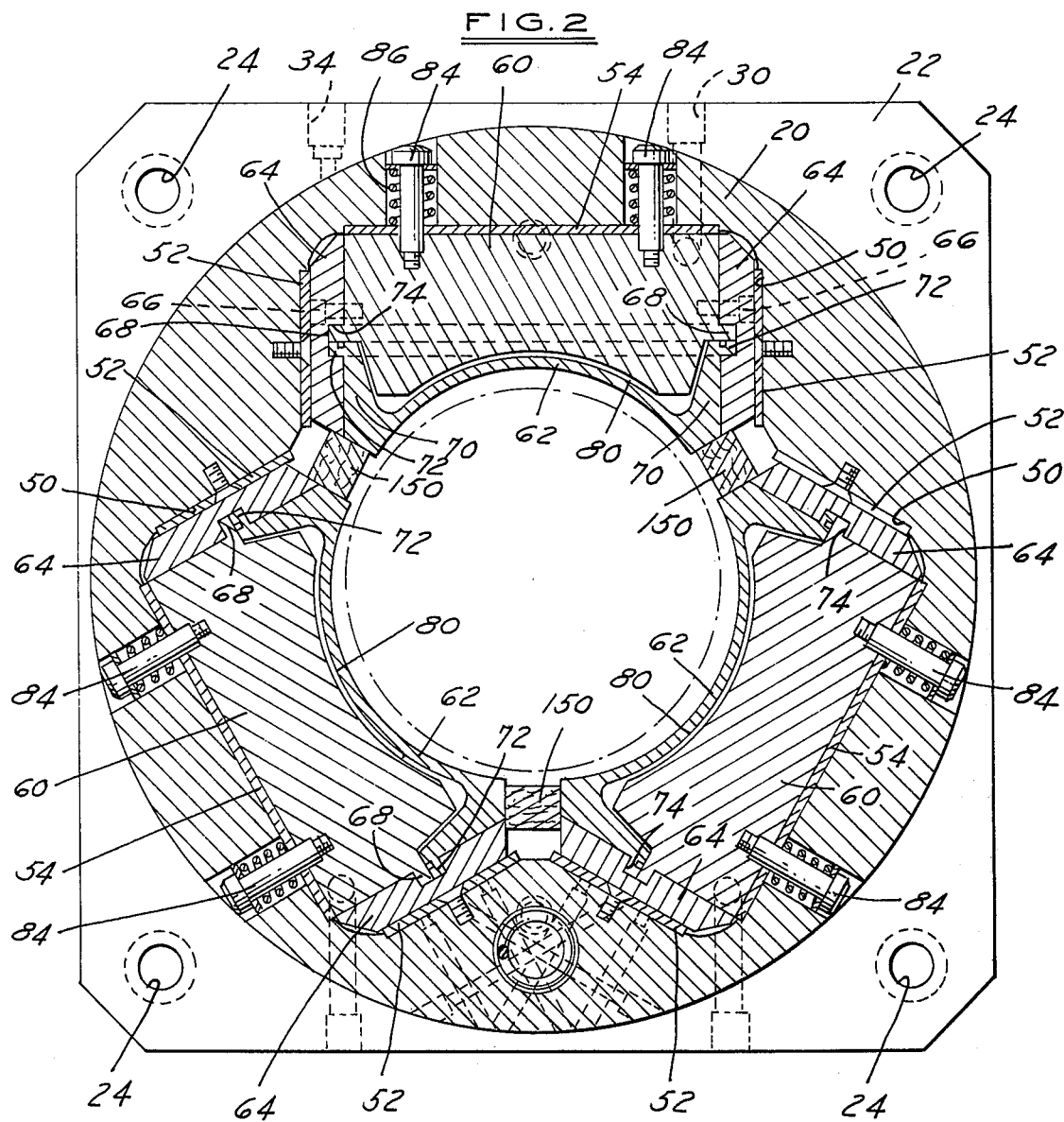

FIG. 2, a sectional view on line 2—2 of FIG. 1.

FIG. 3, a view of a movable wedge member.

Figure 4:
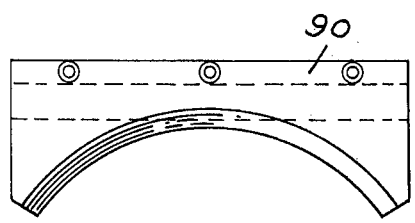

FIG. 4, an end view of a retaining segmental ring member taken on line 4—4 of FIG. 1.

REFERRING TO THE DRAWINGS

In FIG. 1, a circular body 20 has a mounting flange 22 with corner holes 24 secured thereto. The mounting flange has a cylindrical recess 26 which receives a grooved cylindrical extension 28 on the body. The grooves carry O-rings to seal the parts. The flange 22 has a peripheral hole 30 for oil mist to allow lubrication of the parts to be described. Between the O-ring grooves is an annular groove 32 which connects to a hydraulic pressure hole 34. The groove 32 will transmit hydraulic pressure to passages leading to pressure chambers which exert hydraulic pressure on flexing walls to be described.

An Alemite fitting 36, accessible through a hole in flange 22, allows the convenient lubrication of the slide surfaces of the moving parts.

Flange 22 has a central opening 38 through which a part may be inserted. Behind the flange 22 is an arcuate front pad cap 40 which will be later described.

In the embodiment shown, there are three movable clamping assemblies disposed 120° apart around the axis of the body 20. Other multiples might be used depending on particular needs or requirements. Viewing FIG. 2, it will be seen that there are three substantially rectangular recesses 50 disposed about the circular body. The opposed sides of these recesses are lined by slide wear plates 52 having suitable lubrication grooves (not shown). The base of the recess is lined by a slide wear plate having suitable lubrication grooves (not shown). These wear plates are suitably retained by flat, countersunk screws.

In each recess 50 is a pressure pad block assembly composed of a tapered block body 60, an arcuate winged chuck pad 62, and grooved side-retainer plates 64, the latter being secured by headed screws 66. The sides of blocks 60 have a boss 68 and the wings 70 of the chuck pads have an outwardly extending flange 72. These bosses and flanges are captured in the groove 74 of retainer plates 64. A sealing strip can be inserted between the parts which, when assembled, provide a grease chamber 80 between the face of the block 60 and the inner surface of the chuck pad 62. The chuck pad 62 and the integral wings are preferably formed of a dense but pliant plastic such as nylon, Teflon, or polyurethane which will flex in the thinner walls to adapt to a work part.

Each pressure pad block assembly is mounted in the recesses 50 for radial movement, each block being supported by cap screws 82 and 84, the heads of which ride on coil springs 86 supported radially by wear plates 54.

The ends of the pressure chuck pads 62 are sealed to the blocks 60 by front and rear pads 40 and 90 screwed securely to the block 60 and having grooves to entrap the boss of block 60 and the flange of the pads 62. This is clearly shown in FIG. 1. The profile of the rear pressure pad is shown in FIG. 4. Headed screws 92 hold the pad caps 40 and 90 to the respective ends of block 60.

A connector pin 94 screws into block 60 centrally thereof and extends radially outward in port 96 in sliding relation to body 60.

The connector pin has a cross-passage 97 and an axial passage 99 leading to the chamber 80. A passage 32a in body 20 parallel to the center axis is connected by a short feeder part to annular groove 32 connected to pressure port 34. O-rings on either side of cross-passage 97 seal the passages while permitting connector pin to shift in the port 96. Thus, when these passages are filled with a grease, pressure at port 34 will be transmitted to the chambers 80 to the move pad walls 62 outward to apply pressure to the workpiece.

Above each pressure pad block assembly lying in the wedge-shaped recess between block 60 and housing 20 is a movable wedge block 100 shown in plan in FIG. 3. These blocks have slots 102 in the knife edge to accommodate screws 82 and slots 104 to accommodate screws 84, these slots making it possible for the wedge to move longitudinally. A central slot 106 accommodates the connector pin 94.

It will be seen that the body 20 has a rearwardly extending flange 110 and that ends of the wedges 100 extend into the space within the flange. A flanged back ring 112 has a flange which projects inwardly to underlie flange 110 to form an annular recess 144. Cap screws 116 retain the ring 112. Within the recess 114 and fastened to the butt ends of wedges 100 is a ring piston 120. Spaced circumferentially around the body 20 are holes 122 which seat springs 124 bearing against ring piston 120 and located by a pin 126. These springs urge the ring piston 120 and the wedges 100 rearwardly.

An air port 128 connects to a surface groove 130 so that air under pressure can urge ring piston 120 forward against the action of springs 124.

The wedges 100 and the blocks 60 have contacting surfaces 140 properly relieved on either side to assure a sliding relationship. The wedge angle is preferably about 7° or a little more which is higher than a locking angle. Suitable chip seals 150 are provided between the block assemblies.

IN THE OPERATION

It will be seen that the wedge parts and the sliding blocks will be lubricated through the mist port 30 which connects suitably around the housing assembly to all of the working parts through ports and passages provided therefor. Also, the chambers 80 will be filled with grease through the Alemite fittings and the pressure system connected to valve 164 and pump 166.

The parts at rest will be as shown in FIG. 1 with ring 120 retracted by springs 124 and the three wedges 100 also retracted. This permits lift springs 86 to retract the block pad assemblies radially outward. Air from pump 160 is blocked by valve 162 from port 128. A work part is assembled into the unit as shown in FIG. 1 and valve 162 actuated to direct air under pressure to ring piston 120. Air at approximately 40 pounds per square inch is adequate. This moves wedges 100 forward and forces the pressure pad blocks 60 radially inward against the work with light pressure.

A valve 164 controlling pressure from pump 166 delivers pressure to port 34 and ring passage 32 and this will deliver pressure through suitable passages 32a and the connector pin 94 to the pressure chambers 80, thus urging the flexible walls 62 into clamping contact with the work part. The ability of the pad walls 62 to flex allows them to fit to the eccentricities or roughness of the part without distorting it.

Machining or grinding can then take place and the part released by shifting valves 164 and 162. Automatic valve controls can be utilized if desired. Once the air pressure and the grease pressure is released, the springs 86 and 124 will expand to retract the wedges 100 and the pad blocks 60 to release the part.

It will thus be seen that the hydrostatic chuck has much greater tolerance capacity for introduction of a workpiece. The retracted pad blocks provide ample clearance to insert a rough part or a part with an out-of-round exterior. This was not possible in the strictly hydrostatic units since the clamping motion was very small. Once the part is located by the wedged block pads with a relatively light pressure, the clamping and holding pressure can be applied with increase in pressure in the grease chambers and a very slight motion of the pads 62 will conform them to the workpiece surface and cause a tight gripping of the part for any machining or grinding operation.

I claim:

1. A work clamp comprising:
   (a) a support body to lie adjacent a work part,
   (b) a plurality of pressure pads movably disposed in said body,
   (c) means to mechanically move said pads to a position contacting a work part and to hold said pads in said position,
   (d) a flexible pressure actuated wall between said pad and said work part having a fluid chamber to receive pressure to urge said wall into holding contact with said part,
   (e) the support body having a plurality of open-topped rectangular recesses disposed about a common axis, each recess having side walls and a base to serve as a slide surface,
   (f) said pressure pads being disposed singularly in said recesses and having side surfaces to cooperate with said side slide surfaces of said recesses, and
   (g) means to bias said pressure pads toward the base of each respective recess.

2. A work clamp as defined in claim 1 in which said side surfaces of said pressure pad are plates having an elongate groove on the inner surface, a flange extending around said pressure pad and a flange on the sides of said pressure actuated wall having portions received and clamped together in sealing relation in said grooves, pad caps at each end of said pressure pads having grooves to receive and clamp together the remainder of said flanges to seal the pressure actuated wall to said pressure pad to form a fluid chamber, and means to direct pressure to said chamber to exert a holding force on a workpiece surrounded by said pressure pad.

3. A work clamp as defined in claim 1 in which the means to bias said pressure pads comprises a plurality of bolts extending from said pads into said body and coil springs interposed between said bolt heads and a spring seat on said body.

4. A work clamp as defined in claim 1 in which said means to mechanically move said pads comprises wedge blocks slotted to accommodate said bolts, and piston means associated with said wedges to drive them between the support body and the pressure pads.

5. A work clamp as defined in claim 4 in which said piston means comprises a ring slidably mounted in an annular cylinder chamber, and means to direct pressure to a side of said piston to actuate the wedges.

6. A work clamp as defined in claim 5 in which said body has a plurality of circumferentially spaced axial holes opening to said annular chamber, and spring means in said holes biasing said piston to a wedge release position.

7. A work holding clamp for cylindrical work parts of a fragile nature to clamp said parts without distortion which comprises:
   (a) a hollow cylindrical body having a plurality of radial recesses each with parallel chordal sides and open to the interior of said body,
   (b) an axially elongate chuck block radially slidable between the sides of each of said recesses around the axis of said body, each chuck block being tapered on a radially outer side in an axial direction and having a curved inner surface,
   (c) a curved flexible work contact sheath overlying the radially inner surface of each said chuck block peripherally sealed relative to said block to provide a thin pressure fluid chamber between the inner surface of said chuck block and the radially outer surface of said sheath,
   (d) a ring in said body adjacent one end of said radial recesses directly movable axially by a pressure fluid acting thereon, and wedge means axially and respectively disposed adjacent the tapered side of said chuck blocks to shift said blocks radially inward when said ring is moved axially by pressure fluid, and
   (e) means to introduce pressure fluid into said respective pressure fluid chambers to exert a surface clamping pressure on a work part subsequent to radial actuation of said chuck blocks by said wedge means.

* * * * *